3,176,804
FRICTION BRAKING MEANS
Anton F. Erickson, Dayton, Ohio, assignor to General Motors Corporation, Detroit, Mich., a corporation of Delaware
Filed June 26, 1963, Ser. No. 290,697
1 Claim. (Cl. 188—250)

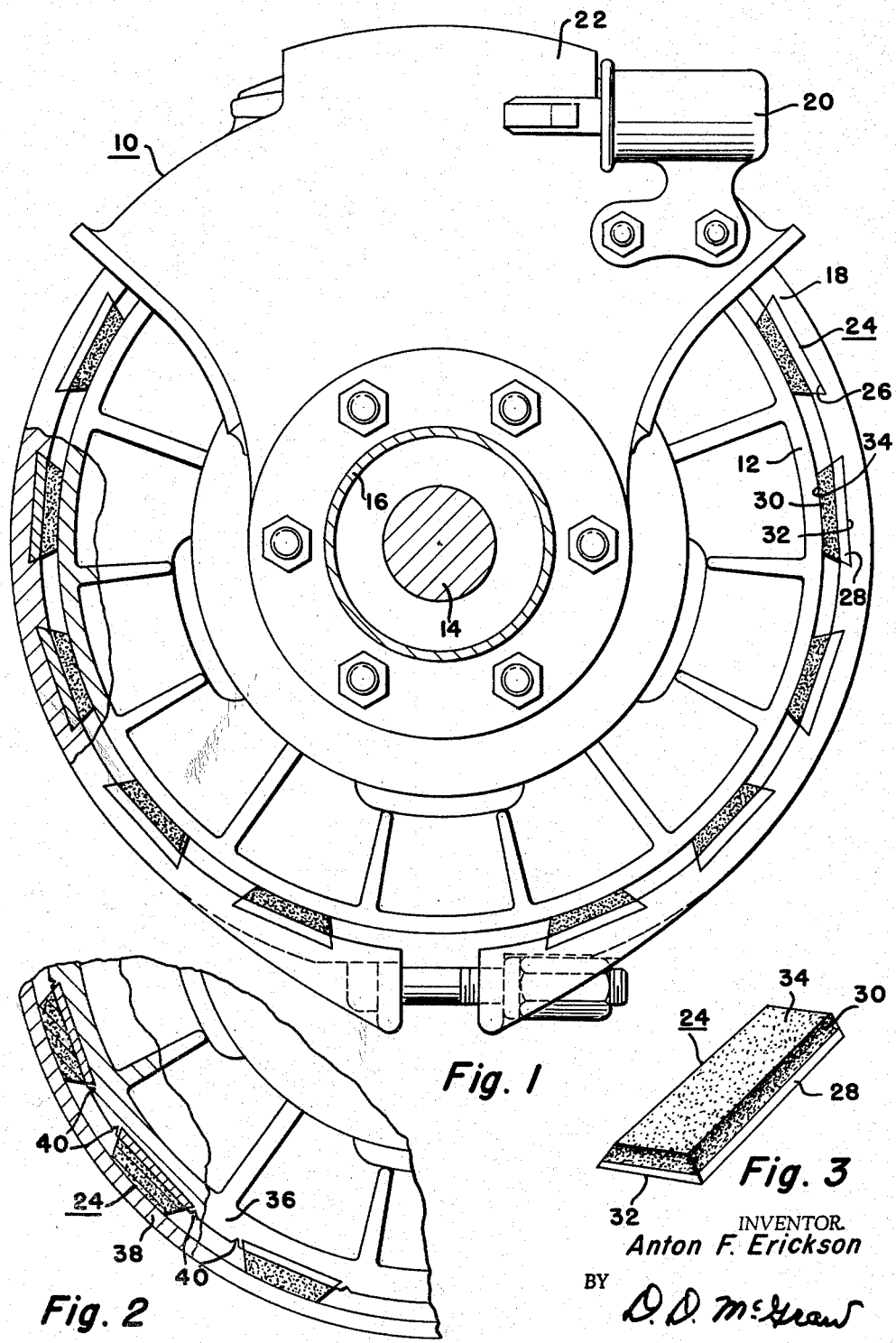

The invention relates to a brake mechanism and more particularly to one wherein a plurality of brake friction elements are provided. In such a brake mechanism the elements are preferably removably mounted in a friction member so that they may be replaced as necessary. The friction elements are also spaced to provide for additional brake cooling effects.

In mechanisms embodying the invention, the individual friction elements are formed with a brake friction material for engaging a brake friction member and a ductile base having the friction material bonded or otherwise secured thereto for attaching the friction elements to the member on which they are mounted. In order to facilitate installation and retention of the elements, the mounting member is provided with dovetail slots which receive the ductile base portion of the friction elements in a press fit relation. The press fit may be obtained by dimensional control of the slots in relation to the ductile base. In some instances it is desirable to provide each slot with a slight taper so that each friction element is easily inserted in the wider slot end and is then press fitted in position by forcing it completely into the slot. In other instances the press fit may be obtained by staking the sides of the slots over the ductile base material so as to tightly hold the elements in place. The elements may be mounted on the brake shoe or the brake drum as desired. The construction may be utilized in band brakes of the internal or external brakes, in servo brakes, disk brakes, or in internally shoe brakes of the duo-servo type, by way of example.

In the drawing:

FIGURE 1 is a side view with parts broken away and in section of a brake mechanism embodying the invention.

FIGURE 2 is a fragmentary view of a modified brake mechanism embodying the invention with parts broken away and in section.

FIGURE 3 is a perspective view of a typical friction element which may be utilized in the brake construction of FIGURE 1 or FIGURE 2.

The brake assembly 10 of FIGURE 1 shows a rotatable drum 12 suitably mounted on an axle 14 extending through a non-rotatable axle housing 16. The brake shoe 18 is illustrated as an external band type brake actuated by suitable actuator mechanism 20 mounted on an actuator mounting frame 22 which is secured to the axle 16. The friction elements 24 are mounted in dovetail slots 26 formed about the inner periphery of the brake band 18. Slots 26 preferably extend transversely across the brake band and are provided in spaced relation as necessary to mount the required number of friction elements to provide the desired braking area.

Friction elements 24 may be constucted as shown in FIGURE 3 and include a ductile base 28 and an upper section of brittle friction material 30. The backing layer 28 may be made of ductile iron with the friction layer being continuously bonded to the backing layer and formed of a suitable low strength non-ductile material. Each friction element is preferably flat on its bottom surface 32 and is curved on its upper surface 34 to fit the braking element engaged by that surface. Since the braking element of FIGURE 1 is engaged on its external surface, the surface 34 of the friction element 24 installed in band 18 would be concave as shown in FIGURE 1. If the brake elements are installed in a friction member so as to engage an internal surface, as shown in FIGURE 2, surface 34 would be convex as illustrated in that figure.

The construction of FIGURE 2 shows the friction elements 24 installed in the drum 36 and engageable with the internal surface of the brake band 38. When other types of brakes are utilized, such as internal expanding brakes, the elements 24 may be similarly installed. FIGURE 2 also shows a modified structure for holding the elements 24 in place. In this instance the side of the ductile slots are staked as shown at 40 to provide an even tighter grip on the lining segment base 28.

By press fitting the elements 24 in position, a firm heat conducting joint is provided so as to more readily conduct heat from the elements 24 to the band 18 or the drum 36 in which they are installed. Furthermore, more equal thermo expansion rates are obtained between the lining segments and the mount. This also provides a stronger joint at elevated temperature levels which often occur in brake systems than does a relatively loose mounting of the elements retained by flanged edges and separate retention means as have been utilized in the past.

I claim:

A braking mechanism comprisnig: a brake shoe member; a brake drum member; a plurality of friction elements having ductile metal bases and brittle drum engaging portions secured to said bases, said elements being mounted in transversely extending dovetail slots in said shoe and frictionally engageable in braking relation with said drum; and means, including said ductile bases on said elements and the sides of said slots, holding said elements press fitted therein; said slot sides formed in press fitting relation only with said element ductile bases and having staked means substantially throughout the lengths thereof engaging only said ductile bases and holding said elements in said slots.

References Cited by the Examiner

UNITED STATES PATENTS

| 101,846 | 4/70 | Emerson | 192—107 |
| 455,033 | 6/91 | Criswell | 188—251 |
| 562,872 | 6/96 | Whitcomb | 188—251 |
| 1,616,659 | 2/27 | Heany | 188—250 |

FOREIGN PATENTS

| 12,215 | 6/93 | Great Britain. |

ARTHUR L. LA POINT, *Primary Examiner.*
EUGENE G. BOTZ, *Examiner.*